(12) United States Patent
Takata et al.

(10) Patent No.: US 7,805,555 B2
(45) Date of Patent: Sep. 28, 2010

(54) MULTIPROCESSOR SYSTEM

(75) Inventors: Hirokazu Takata, Tokyo (JP); Naoto Sugai, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 65 days.

(21) Appl. No.: 12/007,838

(22) Filed: Jan. 16, 2008

(65) Prior Publication Data

US 2008/0172511 A1    Jul. 17, 2008

(30) Foreign Application Priority Data

Jan. 16, 2007 (JP) ............... 2007-006621

(51) Int. Cl.
*G06F 13/24* (2006.01)

(52) U.S. Cl. ........................ 710/260

(58) Field of Classification Search .......... 710/260–269
See application file for complete search history.

(56) References Cited

U.S. PATENT DOCUMENTS

| | | | | |
|---|---|---|---|---|
| 4,768,149 | A * | 8/1988 | Konopik et al. ........... | 710/47 |
| 5,283,904 | A * | 2/1994 | Carson et al. ........... | 710/266 |
| 5,410,710 | A * | 4/1995 | Sarangdhar et al. ....... | 710/266 |
| 5,428,799 | A * | 6/1995 | Woods et al. ........... | 710/266 |
| 5,905,897 | A * | 5/1999 | Chou et al. ........... | 710/260 |
| 6,189,065 | B1 * | 2/2001 | Arndt et al. ........... | 710/260 |
| 6,711,643 | B2 * | 3/2004 | Park et al. ........... | 710/260 |
| 6,738,847 | B1 * | 5/2004 | Beale et al. ........... | 710/260 |
| 6,813,665 | B2 * | 11/2004 | Rankin et al. ........... | 710/260 |
| 7,328,294 | B2 * | 2/2008 | Kim et al. ........... | 710/260 |
| 7,366,814 | B2 * | 4/2008 | Shimizu et al. ........... | 710/268 |
| 7,444,639 | B2 * | 10/2008 | Jahnke ............... | 718/105 |

FOREIGN PATENT DOCUMENTS

| JP | 05-324569 | 12/1993 |
|---|---|---|
| JP | 08-036498 | 2/1996 |
| JP | 09-212472 | 8/1997 |
| JP | 2001-236238 | 8/2001 |
| JP | 2005-182177 | 7/2005 |

* cited by examiner

*Primary Examiner*—Paul R Myers
(74) *Attorney, Agent, or Firm*—McDermott Will & Emery LLP

(57) ABSTRACT

The present invention provides a technique capable of processing a plurality of interrupt causes sharing one interrupt request in different processors. An interrupt controller outputs an interrupt request when the interrupt request shared by a plurality of interrupt causes is notified. The interrupt request output by the interrupt controller is accepted by one of the processors. The processor accepting the interrupt request determines whether the interrupt cause that the processor must process has occurred, executes an interrupt processing when such interrupt cause has occurred, and notifies the generation of the interrupt request to another processor that processes another interrupt cause of the plurality of interrupt causes sharing the interrupt request when the relevant interrupt cause has not occurred.

7 Claims, 11 Drawing Sheets

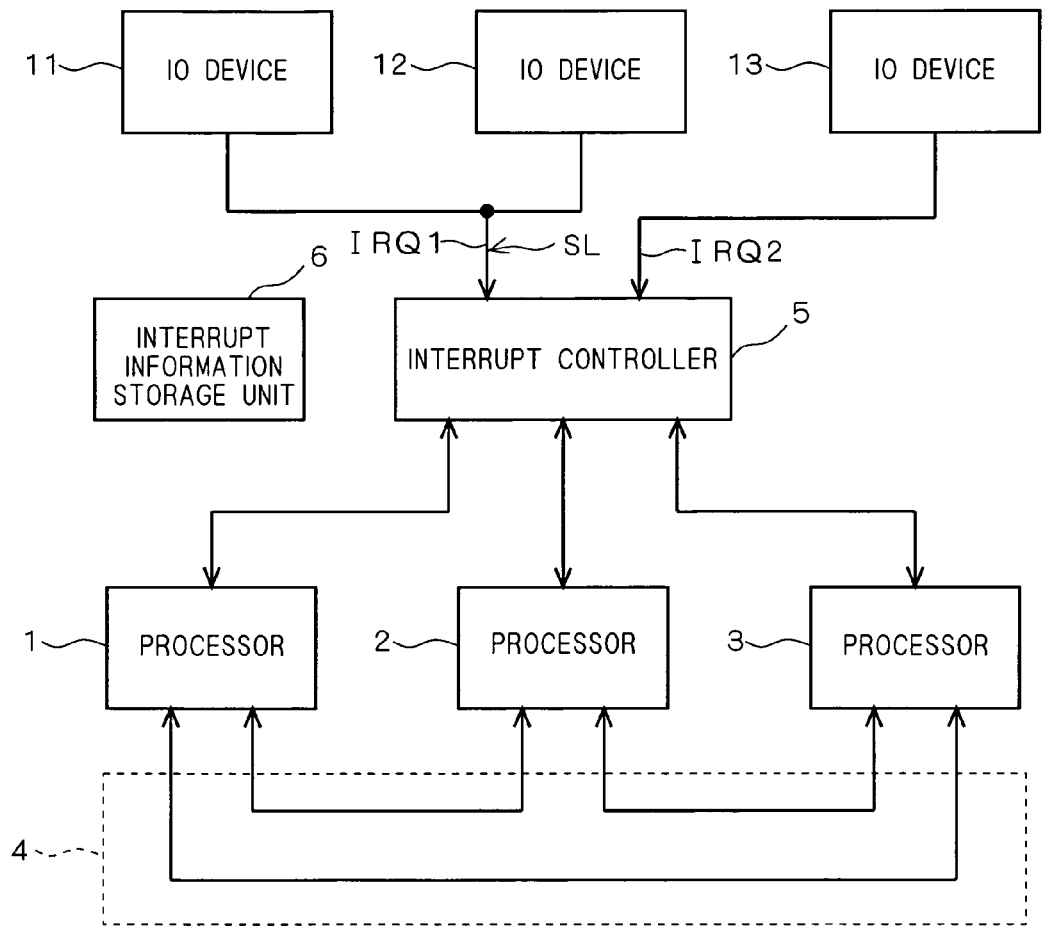

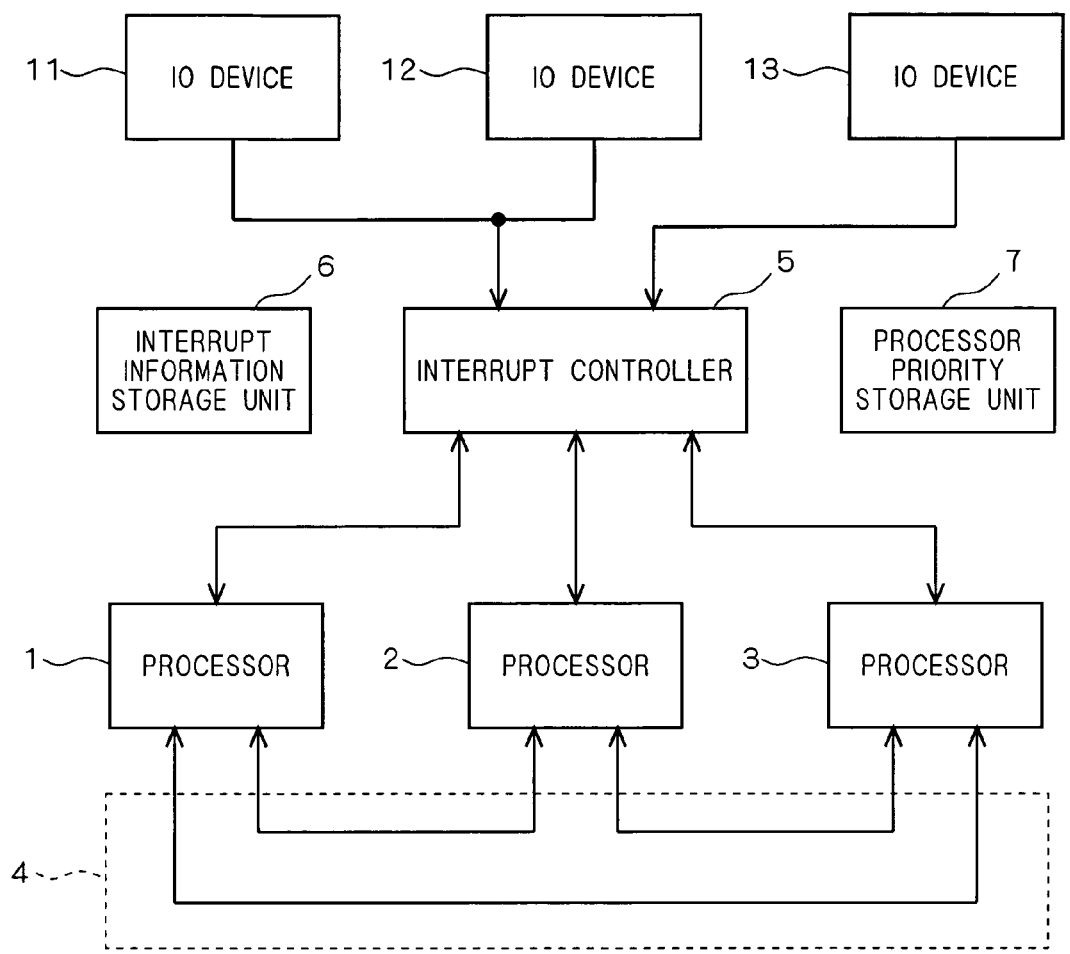

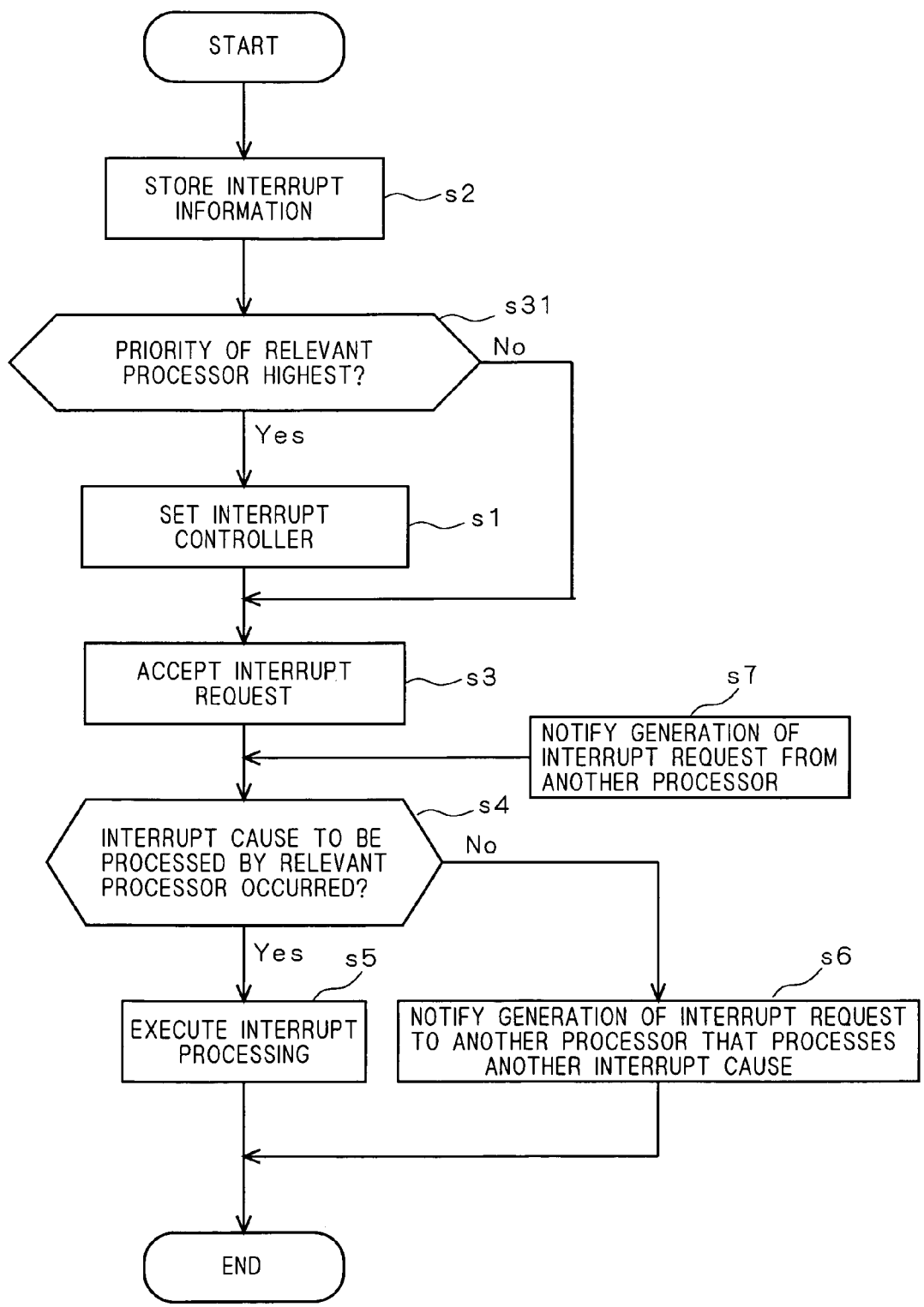

F I G . 1 0

| IIF | INTERRUPT CAUSE NUMBER | INTERRUPT PRIORITY | INTERRUPT REQUEST NUMBER | PROCESSOR NUMBER |
|---|---|---|---|---|
| | 1 | 5 | 1 | 1 |
| | 2 | 10 | 1 | 2 |
| | 3 | 5 | 2 | 3 |
| | 4 | 1 | 1 | 3 |

F I G . 1 2
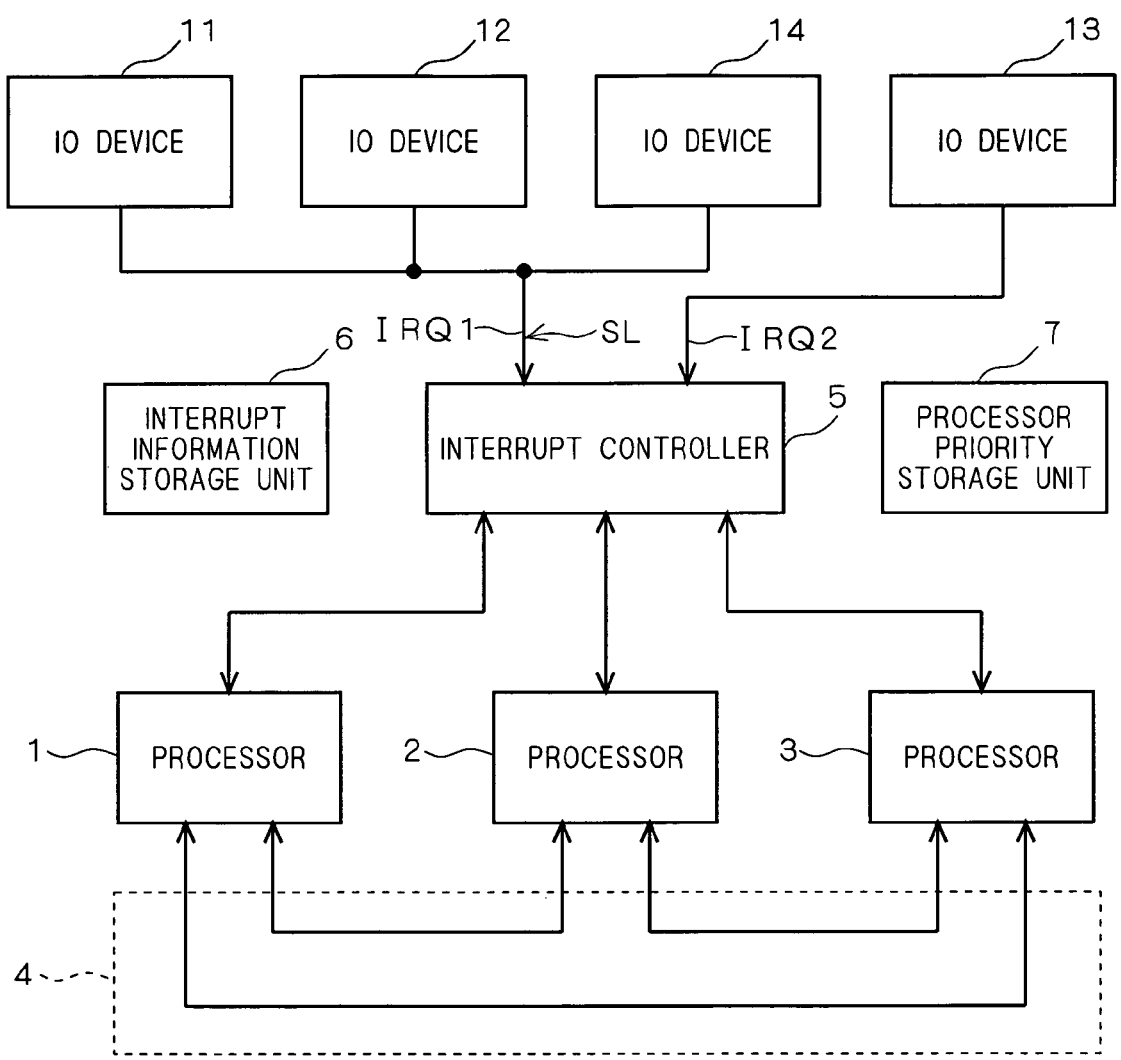

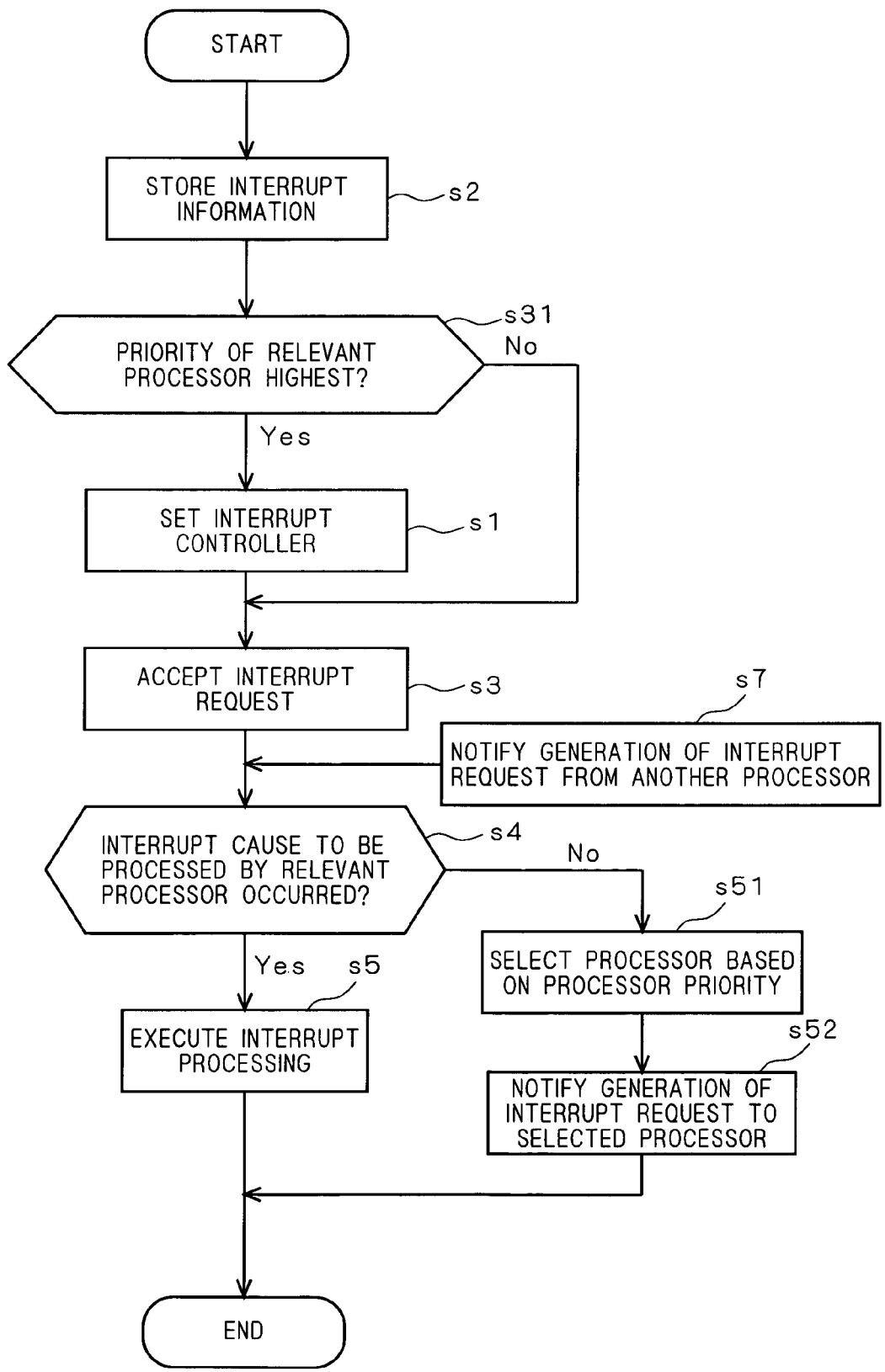

MULTIPROCESSOR SYSTEM

BACKGROUND OF THE INVENTION

1. Field of the Invention

The present invention relates to a multiprocessor system including a plurality of processors.

2. Description of the Background Art

Various techniques have been proposed from the related art regarding the multiprocessor system including a plurality of processors. For instance, a technique of distributing the load of an interrupt processing in a bus-sharing multiprocessor system to enhance system performance is disclosed in Japanese Patent Application Laid-Open No. 5-324569. A technique related to interrupt processing in the multiprocessor system is also disclosed in Japanese Patent Application Laid-Open No. 8-36498, Japanese Patent Application Laid-Open No. 9-212472, Japanese Patent Application Laid-Open No. 2001-236238, and Japanese Patent Application Laid-Open No. 2005-182177.

A technique in which a plurality of interrupt causes shares one interrupt request, in other words, a technique in which a signal line for transmitting the interrupt request is shared among a plurality of devices at where the interrupt cause occurs is used in a multiprocessor system having a PCI (Peripheral Components Interconnect) bus, and the like.

In the conventional multiprocessor system, a plurality of interrupt requests can be assigned to different processors, but the plurality of interrupt causes can only be processed in one processor if the plurality of interrupt causes is sharing one interrupt request. Therefore, the interrupt request must be assigned individually to each of the plurality of interrupt causes in order to process the plurality of interrupt causes in different processors. As a result, the types of interrupt requests increase, and the number of signal lines for transmitting the interrupt request increases.

SUMMARY OF THE INVENTION

The present invention aims to provide a technique of processing a plurality of interrupt causes sharing one interrupt request in different processors.

A multiprocessor system of the present invention includes a plurality of processors, and an interrupt controller for outputting an interrupt request when notified of the interrupt request shared by a plurality of interrupt causes. The interrupt request output from the interrupt controller is accepted by one of the plurality of processors. The processor accepting the interrupt request determines whether the interrupt cause which the processor must process has occurred, executes an interrupt processing corresponding to the interrupt cause when the interrupt cause has occurred, and notifies generation of the interrupt request to another the processor that processes another interrupt cause when the interrupt cause has not occurred Since the processor accepting the interrupt request shared by a plurality of interrupt causes executes an interrupt processing corresponding to the interrupt cause when the interrupt cause that the processor must process of the plurality of interrupt causes has occurred, and notifies the generation of the interrupt request to another processor that processes another interrupt cause when the interrupt cause has not occurred, the other processor can process the interrupt cause that the other processor must process without accepting the interrupt request from the interrupt controller. Thus, a plurality of interrupt causes sharing one interrupt request can be processed by different processors.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a configuration of a multiprocessor system according to a first embodiment of the present invention:

FIG. 2 is a view showing interrupt information according to the first embodiment of the present invention;

FIG. 6 is a view showing a configuration of a multiprocessor system according to a third embodiment of the present invention;

FIG. 7 is a view showing information stored in a processor priority storage unit according to the third embodiment of the present invention;

FIG. 8 is a flowchart showing an operation of the multiprocessor system according to the third embodiment of the present invention;

FIG. 10 is a view showing interrupt information according to the fourth embodiment of the present invention;

FIG. 12 is a view showing a configuration of a multiprocessor system according to a fifth embodiment of the present invention; and FIG. 13 is a flowchart showing an operation of the multiprocessor system according to the fifth embodiment of the present invention.

DESCRIPTION OF THE PREFERRED EMBODIMENTS

First Embodiment

Figure 3:
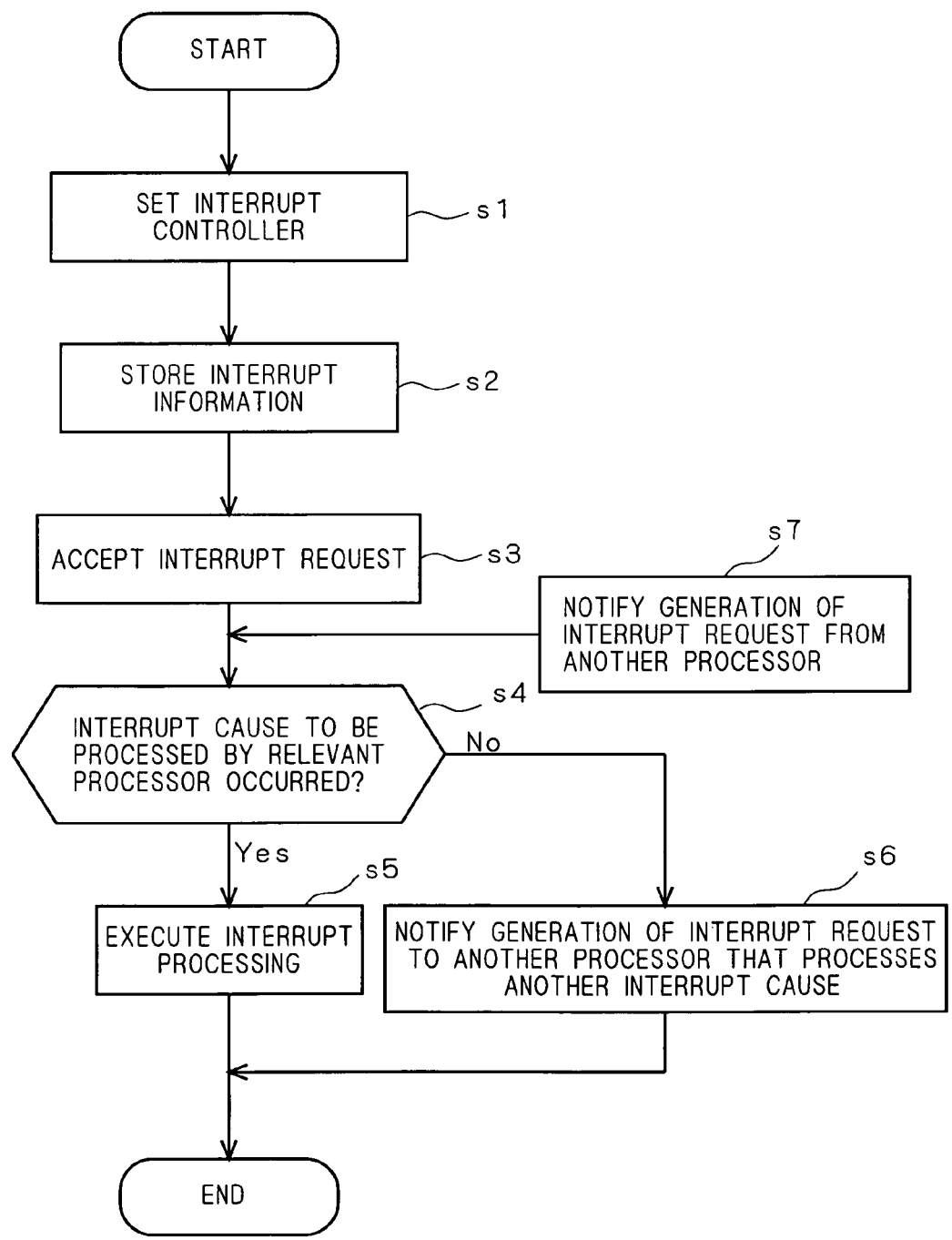
FIG. 3 is a flowchart showing an operation of the multiprocessor system according to the first embodiment of the present invention.

FIG. 1 is a block diagram showing a configuration of a multiprocessor system according to the first embodiment of the present invention. As shown in FIG. 1, the multiprocessor system according to the present first embodiment includes a plurality of processors 1 to 3 each having interrupt capabilities, an interrupt controller 5 for notifying the interrupt request to the processors 1 to 3, an interrupt information storage unit 6, and a plurality of IO devices 11 to 13.

The processors 1 to 3 use a communication line 4 for directly connecting the processors 1 to 3 to exchange information with each other. The IO devices 11 to 13 are serial I/O port, parallel I/O port, timer, or DRAM controller, and the interrupt cause occurs in each one. If the IO device 11 is a timer, the interrupt cause that occurs in the IO device 11 is the end of count of a constant time.

Each IO device 11 to 13 outputs an interrupt request when the interrupt cause occurs. The IO devices 11, 12 share a signal line SL for transmitting the outputting interrupt request to the interrupt controller 5, where the interrupt requests output from the IO devices 11, 12 are respectively transmitted through the signal line SL and input to the interrupt controller 5 as an interrupt request IRQ1. Therefore, the interrupt request IRQ1 is notified to the interrupt controller 5 when the interrupt cause occurs in the IO device 11 and when the interrupt cause occurs in the IO device 12. Thus, in the present first embodiment, the interrupt request IRQ1 input to the interrupt controller 5 is shared by a plurality of interrupt causes occurring in the IO devices 11, 12. The interrupt controller 5 thus is not able to know whether the interrupt cause occurred in the IO device 11 or 12 from only the notification of the interrupt request IRQ1.

The interrupt request output from the IO device 13 is input as it is to the interrupt controller 5 as an interrupt request IRQ2. Therefore, the interrupt request IRQ2 notified to the interrupt controller 5 is not shared by a plurality of interrupt causes.

In the multiprocessor system according to the present first embodiment, interrupt cause numbers one to three are respectively assigned to the interrupt causes occurring in the IO devices 11 to 13, and interrupt request numbers one and two are respectively assigned to the interrupt requests IRQ1 and IRQ2. Processor numbers one to three are respectively assigned to the processors 1 to 3.

In the present first embodiment, the processor 1 number one processes interrupt cause number one, the processor 2 number two processes interrupt cause number two, and the processor 3 number three processes interrupt cause number three. In other words, the processors 1 to 3 respectively process the interrupt cause occurring in the IO devices 11 to 13. The interrupt request IRQ1 is notified to the interrupt controller 5 when the interrupt cause occurs in the IO devices 11 and 12, and the interrupt request IRQ2 is notified to the interrupt controller 5 when the interrupt cause occurs in the IO device 13. Therefore, interrupt cause number one corresponds to interrupt request IRQ1 number one and the processor 1 number one, the interrupt cause number two corresponds to interrupt request IRQ1 number one and the processor 2 number two, and the interrupt cause number three corresponds to interrupt request IRQ2 number two and the processor 3 number three. The correspondence relationship of the interrupt cause number, the interrupt request number, and the processor number is stored as interrupt information IIF in the interrupt information storage unit 6 according to the present first embodiment. FIG. 2 is a view showing the interrupt information IIF.

The interrupt controller 5 references the interrupt information IIF and outputs the interrupt request to the processor assigned with the number corresponding to the number of the notified interrupt request. In the present example, the interrupt controller 5 outputs the interrupt request IRQ1 to the processors 1 and 2, and the interrupt request IRQ2 to the processor 3. Each processor 1 to 3 executes interrupt processing corresponding to the interrupt cause that each processor 1 to 3 must process when accepting the input interrupt request. Each processor 1 to 3 can set the interrupt controller 5 on whether or not to be output with the interrupt request from the interrupt controller 5.

The operation until executing the interrupt processing in the processors 1, 2 according to the present first embodiment will now be described in detail. FIG. 3 is a flowchart showing the operation of the processors 1, 2. Since the processors 1, 2 perform similar operation with respect to each other, the operation of the processor 1 will be centrally described below.

As shown in FIG. 3, the processor 1 sets the interrupt controller 5 so as to be notified of the interrupt request from the interrupt controller 5 in step s1. In step s2, the processor 1 stores its processor number in the interrupt information storage unit 6 in correspondence to the number of the interrupt cause which the processor 1 processes. The interrupt information IIF only contains the correspondence relationship of the interrupt cause number and the interrupt request number at the initial state of the interrupt information storage unit 6, and the processor number corresponding thereto is written to the interrupt information IIF by the processor. The steps s1 and s2 are normally executed in an initialization process of an operating system or in an initialization process of a device drive of the IO devices 11, 12.

The processor 1 accepts the interrupt request IRQ1 output from the interrupt controller 5 in step s3, and determines whether the interrupt cause that the processor 1 must process has occurred in step s4.

Interrupt status information is stored in the interrupt controller 5 for every input interrupt request. The interrupt status information changes from "0" to "1" when the corresponding interrupt request is generated. When the interrupt request IRQ1 is input, the interrupt controller 5 simultaneously outputs the interrupt request IRQ1 to the processors 1, 2 and sets the interrupt status information corresponding to the interrupt request IRQ1 to "1". After being notified of the interrupt request IRQ1, each processor 1, 2 reads out the interrupt status information corresponding to the interrupt request IRQ1 from the interrupt controller 5. Since the interrupt status information in the set state is changed from "1" to "0" and is cleared when read out from the processor, only the processor that read out the interrupt status information first can read out the interrupt status information indicating "1". If the interrupt status information read out is "1", each processor 1, 2 accepts the interrupt request IRQ1 and executes step s4. Thus, the interrupt request IRQ1 shared by a plurality of interrupt causes is accepted by one of the processors 1, 2.

Each IO device 11 to 13 stores status information indicating whether or not an interrupt cause has occurred. Each processor 1, 2 determines whether or not the interrupt cause that each processor 1, 2 must process has occurred by reading out the status information in the IO device at where the interrupt cause which the relevant processor must process occurs in step s4.

When determining that the interrupt cause that the processor 1 must process has occurred in step s4, the processor 1 executes an interrupt handler corresponding to the relevant interrupt cause to perform the interrupt processing in step s5.

When determining that the interrupt cause that the processors must process has not occurred in step s4, the processor 1 references the interrupt information IIF in the interrupt information storage unit 6, specifies a processor that processes another interrupt cause sharing the interrupt request IRQ1, and notifies the generation of the interrupt request IRQ1 to the relevant processor using the communication line 4. In the present example, the processor 1 notifies the processor 2 and the processor 2 notifies the processor 1 of the generation of the interrupt request IRQ1 since the interrupt request IRQ1 is shared by the interrupt causes occurring in the IO devices 11, 12, and the interrupt causes occurring in the IO devices 11, 12 are processed in the processors 1, 2, respectively. The interrupt function dedicated to between the processors provided to each processor 1 to 3 may be used to notify the generation of the interrupt request between the processors.

A case where the interrupt request IRQ1 is shared by two processors 1 and 2 has been described, but the interrupt request IRQ1 may be shared among three or more processors. When the interrupt request IRQ1 is shared by the processors 1 to 3, the processor 1 notifies the generation of the interrupt request IRQ1 to the processor 2 in the order of the number of the processor when determined that the interrupt cause that the processor must process has not occurred, and the processor 2 notifies the generation of the interrupt request IRQ1 to the processor 3 when determining that the interrupt cause that the processor 2 must process has not occurred.

When the interrupt request IRQ1 is shared by three or more processors, the processor that read out the interrupt status information indicating "1" from the interrupt controller 5 the earliest may read out the status information of each 10 device, and notify the generation of the interrupt request IRQ2 only to the appropriate processor that processes the relevant interrupt cause.

When notified of the generation of the interrupt request IRQ1 from another processor that has executed step s6 in step s7, the processor 1, executes step s4 to determine whether the interrupt cause that processor 1 must process has occurred even if not accepting the interrupt request IRQ1 in step s3. The processor 1 executes step s5 or step s6 depending on the determination result of step s4.

Since the interrupt request IRQ2 notified to the processor 3 corresponds to one interrupt cause, the processor 3 sequentially executes steps s1 to s3, and thereafter executes step s5 without executing step s4 to execute the interrupt processing corresponding to the interrupt cause that the processor 3 must process.

In the present first embodiment, the processors 1, 2 to be notified of the interrupt request IRQ1 and the processor 3 to be notified of the interrupt request IRQ2 do not overlap, and thus the interrupt controller 5 outputs the interrupt request IRQ1 to the processors 1, 2 and outputs the interrupt request IRQ2 to the processor 3 when the interrupt request IRQ1, IRQ2 are simultaneously input. Therefore, the interrupt cause that occurred in the IO device 11 or the IO device 12 is processed in one of the processors 1, 2 and the interrupt cause that occurred in the IO device 13 is processed in the processor 3.

As opposed to the present first embodiment, if the interrupt cause occurring in the IO device 13 is processed by the processor 2 instead of the processor 3, the processors 1, 2 to be notified of the interrupt request IRQ1 and the processor 2 to be notified of the interrupt request IRQ2 overlap, and thus the interrupt controller 5 outputs only one interrupt request IRQ1 or IRQ2 when the interrupt requests IRQ1, IRQ2 are simultaneously input in order to prevent a plurality of interrupt requests from being simultaneously input to one processor. In this case, an interrupt priority indicating a priority of processing assigned to each interrupt cause is used. The interrupt priority is also written to the interrupt information IIF of the interrupt information storage unit 6 in correspondence to each interrupt cause number, and thus the interrupt controller 5 references the interrupt information IIF and outputs the interrupt request corresponding to the interrupt cause of highest interrupt priority when the interrupt requests IRQ1, IRQ2 are simultaneously input. For instance, if the interrupt priority corresponding to the interrupt cause number "2" is the highest, the interrupt controller 5 outputs only the interrupt request IRQ1.

Therefore, in the multiprocessor system according to the present first embodiment, the processor 1 accepting the interrupt request IRQ1 shared by a plurality of interrupt causes executes the interrupt processing when the interrupt cause that the processor 1 must process of the plurality of interrupt causes has occurred, and notifies the generation of the interrupt request IRQ1 to the processor 2 that processes another interrupt cause when the interrupt cause that the processor 1 must process has not occurred. Therefore, the processor 2 can process the interrupt cause that the processor 2 must process without accepting the interrupt request IRQ1 from the interrupt controller 5, as described in the present first embodiment.

Similarly, the processor 2 accepting the interrupt request IRQ1 executes the interrupt processing when the interrupt cause that the processor 2 must process has occurred, and notifies the generation of the interrupt request IRQ1 to the processor 1 when the interrupt cause that the processor 2 must process has not occurred. Therefore, the processor 1 can process the interrupt cause that the processor 1 must process without accepting the interrupt request IRQ1 from the interrupt controller 5, as described in the present first embodiment. Accordingly, the plurality of interrupt causes shared by one interrupt request IRQ1 can be respectively processed in the processors 1, 2.

Second Embodiment

In the multiprocessor system according to the first embodiment described above, the interrupt controller 5 outputs the interrupt request IRQ1 to both processors 1 and 2, and the processor that has cleared the interrupt status information in the interrupt controller 5 first of the processors 1 and 2 accepts the interrupt request IRQ1. Therefore, the processor accepting the interrupt request IRQ1 changes according to the operation state of the processors 1 and 2. Thus, the response with respect to the occurrence of interrupt cause having high interrupt priority tends to delay.

For instance, in the case where the interrupt priority of the interrupt cause occurring in the IO device 11 is the highest, and such interrupt cause has occurred and the interrupt request IRQ1 is output from the interrupt controller 5, the processor 1 can process the interrupt cause of high priority that occurred in the IO device 11 at a relatively early stage when the interrupt request IRQ1 is accepted by the processor 1. However, if the interrupt request IRQ1 is accepted by the processor 2, the processor 1 can process the interrupt cause that occurred in the IO device 11 after receiving the notification of generation of the interrupt request IRQ1 from the processor 1, and thus the time until processing the interrupt cause of high priority becomes relatively long.

A multiprocessor system in which the response delay with respect to the occurrence of the interrupt cause having a high interrupt priority is small is provided in the present second embodiment.

Figure 4:
FIG. 4 is a view showing interrupt information according to a second embodiment of the present invention.

FIG. 4 is a view showing the interrupt information IIF stored in the interrupt information storage unit 6 of the multiprocessor system according to the present second embodiment. The multiprocessor system according to the present second embodiment differs from the multiprocessor system according to the first embodiment in terms of the operation of the processors 1 and 2. The multiprocessor system according to the present second embodiment will be described below focusing on the difference with the multiprocessor system according to the first embodiment.

As described above, the interrupt priority is assigned to each interrupt cause, and the interrupt priority is written to the interrupt information IIF in correspondence to each interrupt cause number. That is, a table indicating the correspondence relationship of the interrupt cause number, the interrupt priority, the interrupt request number, and the processor number is stored in the interrupt information storage unit 6 as the interrupt information IIF. In the present example, the interrupt priorities of "5", "10", and "1" are assigned to the interrupt causes number one to three, as shown in FIG. 4. In the present example, the interrupt priority is higher the larger the value of the interrupt priority.

Figure 5:
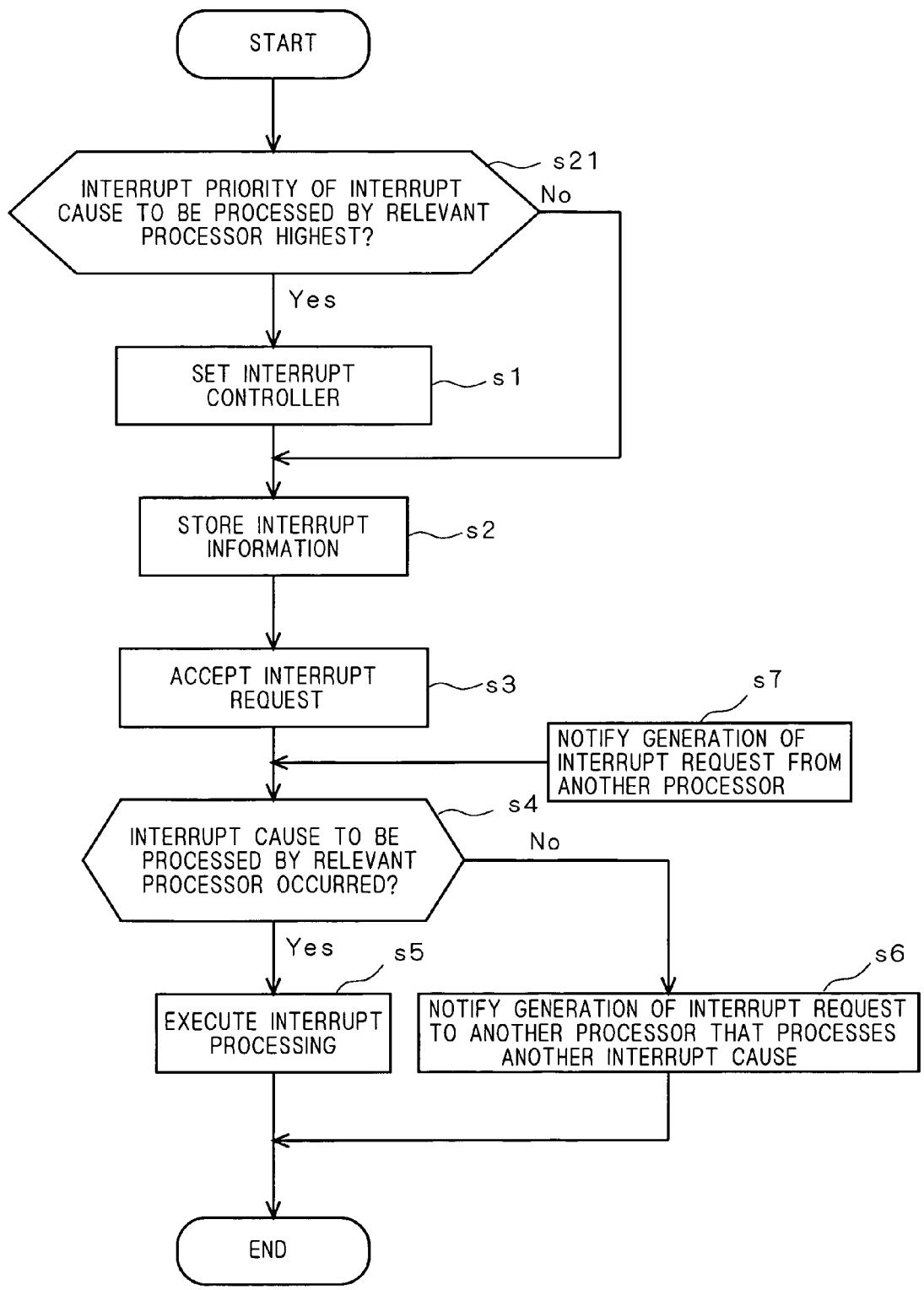
FIG. 5 is a flowchart showing an operation of the multiprocessor system according to the second embodiment of the present invention.

FIG. 5 is a flowchart showing the operation of the processors 1 and 2 according to the present second embodiment. In the present second embodiment as well, since the processors 1, 2 perform similar operation with respect to each other, the operation of the processor 1 will be centrally described below.

As shown in FIG. 5, the processor 1 first references the interrupt information IIF in the interrupt information storage unit 6 and acquires the interrupt priorities of each of a plurality of interrupt causes sharing the interrupt request IRQ1 in step s21. The processor 1 then determines whether the interrupt priority of the interrupt cause that the processor 1 processes is the highest in the acquired interrupt priorities. In the present example, the interrupt priority of the interrupt cause number two to be processed by the processor 2 is the highest in the interrupt priorities of the interrupt causes number one and number two sharing the interrupt request IRQ1, as shown in FIG. 4.

When determining that the interrupt priority of the interrupt cause that the processor 1 processes is the highest in the interrupt priorities of the plurality of interrupt causes sharing the interrupt request IRQ1 in step s21, the processor 1 executes step s1 described above to set the interrupt controller 5 so as to be notified of the interrupt request. On the other hand, when determining that an interrupt cause having an interrupt priority higher than the interrupt priority of the interrupt cause that processor 1 processes exists in the plurality of interrupt causes sharing the interrupt request IRQ1 in step s21, the processor 1 executes step s2 described above without executing step s1.

In this manner, in the present second embodiment, each processor 1, 2 sets the interrupt controller 5 so as to be notified of the interrupt request from the interrupt controller 5 only when determining that the interrupt priority of the interrupt cause each processor 1, 2 processes is the highest in the interrupt priorities of the plurality of interrupt causes sharing the interrupt request IRQ1. Therefore, only the processor that processes the interrupt cause of highest interrupt priority of the plurality of interrupt causes sharing the interrupt request IRQ1 accepts the interrupt request IRQ1.

After step s2 is executed, steps s3 and s4 are executed, and step s5 or step s6 is executed depending on the determination result of step s4, similar to the first embodiment. In the present second embodiment as well, the processor 1 executes step s4 when notified of the generation of the interrupt request IRQ1 from another processor in step s7, and thereafter, executes step s5 or step s6 depending on the determination result of step s4. The operation of the processor 3 is the same as in the first embodiment.

As described above, in the multiprocessor system according to the present second embodiment, determination on whether or not the interrupt cause to be processed by the relevant processor has occurred is first made since only the processor that processes the interrupt cause having the highest interrupt priority of the plurality of interrupt causes sharing the interrupt request IRQ1 accepts the interrupt request IRQ1 from the interrupt controller 5. Therefore, the response delay with respect to the occurrence of the interrupt cause having high interrupt priority can be reduced.

When the interrupt priority of the interrupt cause occurring in the IO device 11 is the highest, and such interrupt cause has occurred and the interrupt request IRQ1 is output from the interrupt controller 5, the interrupt request IRQ1 is reliably accepted by the processor 1. Thus, step s4 is first executed in the processor 1. As a result, the interrupt cause having high priority that occurred in the 10 device 11 is processed at an early stage by the processor 1.

Third Embodiment

FIG. 6 is a block diagram showing a configuration of a multiprocessor system according to the third embodiment of the present invention. As shown in FIG. 6, the multiprocessor system according to the present third embodiment has a processor priority storage unit 7 further arranged in the multiprocessor system according to the first embodiment, and the operation of the processors 1 and 2 is changed. The multiprocessor system according to the third embodiment will be described below focusing on the difference with the multiprocessor system according to the first embodiment.

In the present third embodiment, a processor priority is assigned to each processor 1 to 3. The processor priority indicates the priority for executing the interrupt processing among the processors, and is determined according to the operation system and the processing content of the task. Specifically, when the processing speed differs among the processors 1 to 3, higher processor priority is assigned to the processor having faster processing speed.

FIG. 7 is a view showing one example of the processor priority assigned to the processors 1 to 3. As shown in FIG. 7, the processor priorities of "1", "10", "5" are assigned to the processors 1 to 3 according to the present third embodiment, which processor priorities are stored in the processor priority storage unit 7 in correspondence to the processor number. In the present example, the processor priority is higher the larger the value of the processor priority.

The operation until executing the interrupt processing in the processors 1, 2 according to the present third embodiment will now be described. FIG. 8 is a flowchart showing the operation of the processors 1, 2 according to the present third embodiment. In the present third embodiment as well, since the processors 1, 2 perform similar operation with respect to each other, the operation of the processor 1 will be centrally described below.

As shown in FIG. 8, the processor 1 first executes step s2 described above. In step S31, the processor 1 references the information in the processor priority storage unit 7 and determines whether the processor priority of the processor 1 is the highest in the processors 1, 2 that process the plurality of interrupt causes sharing the interrupt request IRQ1. In the present example, the processor priority of the processor 2 is set the highest in the processors 1, 2 that process the plurality of interrupt causes sharing the interrupt request IRQ1, as shown in FIG. 7.

When determining that the processor priority of the processor 1 is the highest in step s31, the processor 1 executes step s1 to set the interrupt controller 5 so as to be output with the interrupt request, and thereafter, sequentially executes steps s3 and s4.

When determining that a different processor having a processor priority higher than the processor priority of the processor 1 exists in step s31, the processor 1 sequentially executes step s3 and step s4 without executing step s1.

Therefore, in the third embodiment, each processor 1 and 2 sets the interrupt controller 5 so as to be input with the interrupt request only when determining the processor priority of the processors 1 and 2 is the highest in the processors 1, 2 that process the plurality of interrupt causes sharing the interrupt request IRQ1. Therefore, only the processor having the highest processor priority of the processors that process the plurality of interrupt causes sharing the interrupt request IRQ1 accepts the interrupt request IRQ1.

One of the processors 1 or 2 may perform step s31. If only the processor 1 executes step s31, the processor 1 references the information in the processor priority storage unit 7 to specify the processor having the highest processor priority in the processors 1, 2 that process the plurality of interrupt causes sharing the interrupt request IRQ1, and sets the interrupt controller so that the interrupt request is output only to the relevant processor. Accordingly, the processor 1 sets the interrupt controller 5 so as to be output with the interrupt request when the processor priority of the processor 1 is the highest, and sets the interrupt controller 5 so that the interrupt request is output to another processor having the highest processor priority when the processor priority of the processor 1 is not the highest.

After step s4 is executed, step s5 or step 6 is executed depending on the determination result of step s4. In the third embodiment as well, when notified of the generation of the interrupt request IRQ1 from another processor in step s7, the processor 1 executes step s4, and thereafter, executes step s5 or step 6 depending on the determination result of step s4. The operation of the processor 3 is the same as in the first embodiment.

As described above, in the multiprocessor system according to the third embodiment, only the processor having the highest processor priority of the processors that process the plurality of interrupt causes sharing the interrupt request IRQ1 accepts the interrupt request IRQ from the interrupt controller 5. Therefore, the response delay with respect to the occurrence of the interrupt cause in the desired processor can be reduced.

Fourth Embodiment

Figure 9:
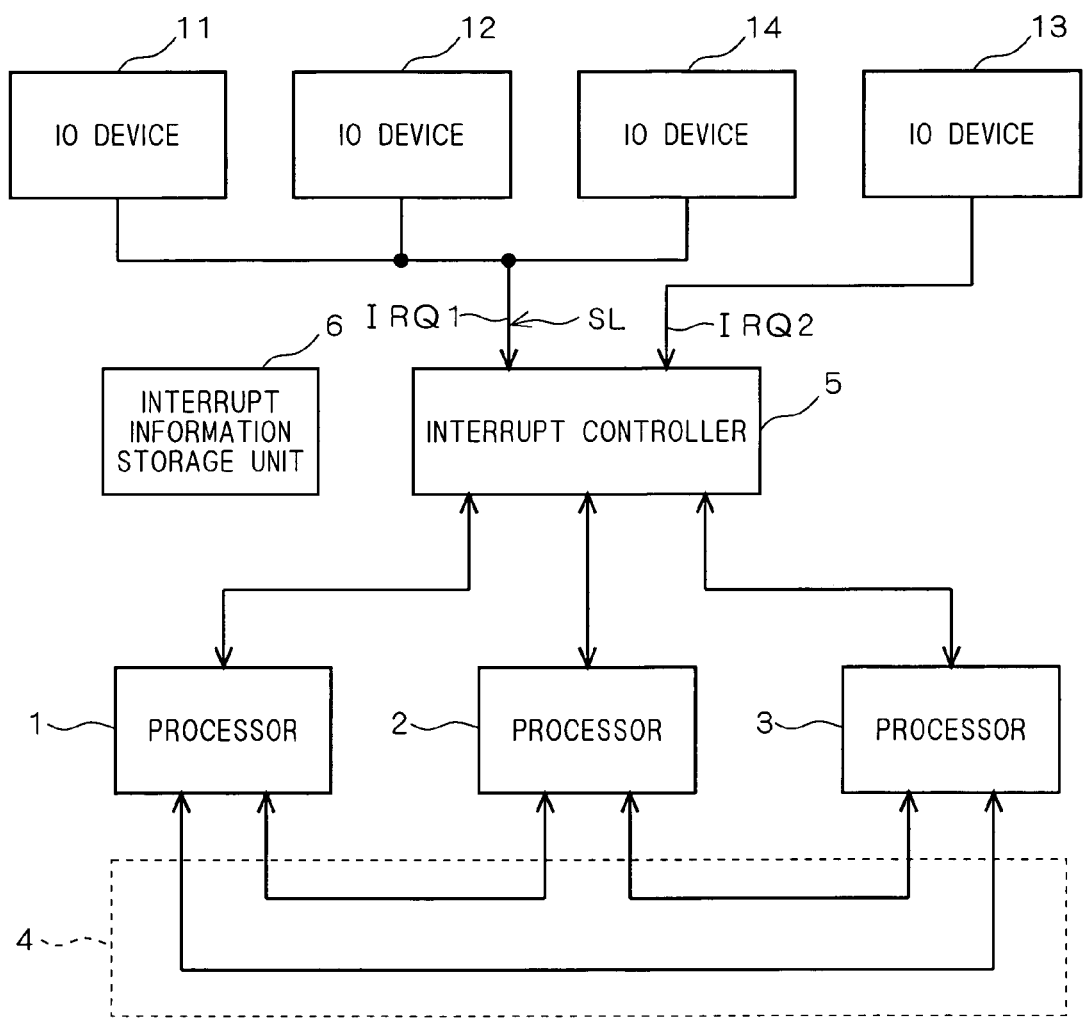
FIG. 9 is a view showing a configuration of a multiprocessor system according to a fourth embodiment of the present invention.

FIG. 9 is a view showing a configuration of a multiprocessor system according to the fourth embodiment of the present invention. The multiprocessor system according to the present fourth embodiment of the present invention basically has an IO device 14 further arranged in the multiprocessor system according to the second embodiment, and the operation of the processors 1 to 3 is changed. The multiprocessor system according to the present fourth embodiment will be described below focusing on the difference with the multiprocessor system according to the second embodiment.

The interrupt cause occurs in the IO device 14 similar to the IO devices 11 to 13. The IO device 14 outputs the interrupt request when the interrupt request occurs. In the present fourth embodiment, the IO devices 11, 12, 14 share the signal line SL for transmitting the outputting interrupt request to the interrupt controller 5, and the interrupt requests output from the IO devices 11, 12, 14 are transmitted through the signal line SL and input to the interrupt controller as an interrupt request IRQ1. Therefore, the interrupt request IRQ1 is notified to the interrupt controller 5 when the interrupt cause occurs in the IO device 11, when the interrupt cause occurs in the IO device 12, and when the interrupt cause occurs in the IO device 14. Therefore, in the present fourth embodiment, the interrupt request IRQ1 input to the interrupt controller 5 is shared by the plurality of interrupt causes occurring in the IO devices 11, 12, 14.

FIG. 10 is a view showing interrupt information IIF stored in the interrupt information storage unit 6 according to the present fourth embodiment. In the present fourth embodiment, the interrupt cause number four is assigned to the interrupt cause occurring in the IO device 14. The processor 3 number three processes the interrupt causes number three and number four. That is, the processor 3 processes the interrupt causes occurring in the IO devices 13, 14. Since the interrupt request IRQ1 is notified to the interrupt controller 5 when the interrupt cause occurs in the 10 devices 11, 12, 14, the interrupt cause number four corresponds to the interrupt request IRQ1 number one and the processor 3 number three, as shown in FIG. 10. Furthermore, the interrupt priorities of "5", "10", "5", "1" are respectively assigned to the interrupt causes number one to four, as shown in FIG. 10. The correspondence relationship of the interrupt cause number, the interrupt priority, the interrupt request number, and the processor number is written in the interrupt information IIF according to the present fourth embodiment.

Figure 11:
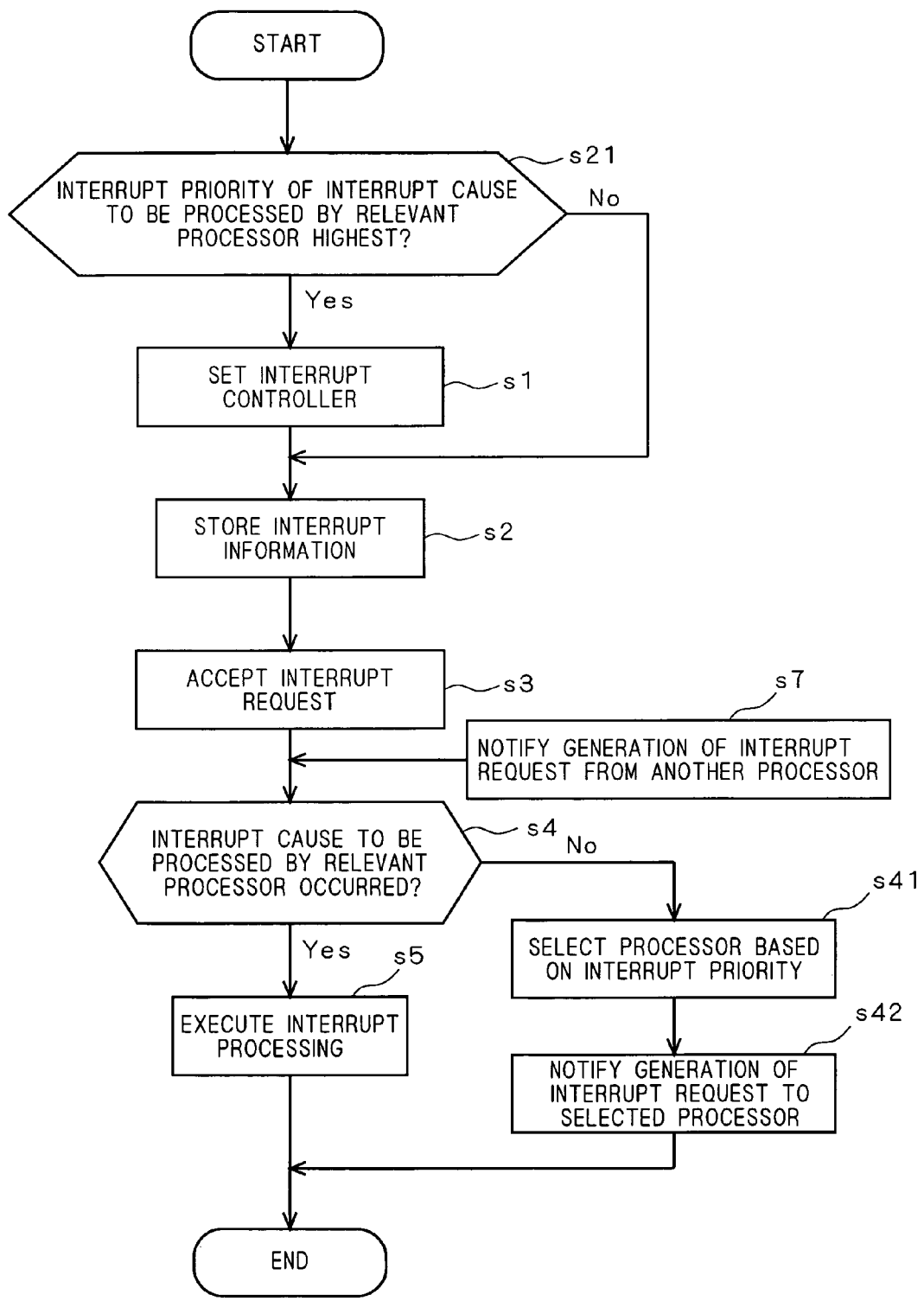
FIG. 11 is a flowchart showing an operation of the multiprocessor system according to the fourth embodiment of the present invention.

FIG. 11 is a flowchart showing the operation until executing the interrupt processing in the processors 1 to 3 according to the present fourth embodiment. Since the processors 1 to 3 perform similar operation with respect to each other, the operation of the processor 1 will be centrally described below.

As shown in FIG. 11, the processor 1 executes step s21 described above. When determining that the interrupt priority of the interrupt cause that the processor 1 processes is the highest in the interrupt priorities of the plurality of interrupt causes sharing the interrupt request IRQ1 in step s21, the processor 1 executes step s1 and sets the interrupt controller 5 so as to be notified of the interrupt request. When determining that the interrupt cause having a higher interrupt priority than the interrupt priority of the interrupt cause that processor 1 processes exists in the plurality of interrupt causes sharing the interrupt request IRQ1 in step s21, the processor 1 executes step s2 without executing step s1.

In this manner, only the processor that processes the interrupt cause having the highest interrupt priority of the plurality of interrupt causes sharing the interrupt request IRQ1 accepts the interrupt request IRQ1.

The processor 1 executes steps s3 and s4 after executing step s2. In the fourth embodiment, the interrupt controller 5 outputs the interrupt request IRQ1 to each processor 1 to 3. Each processor 1 to 3 reads out the interrupt status information corresponding to the interrupt request IRQ1 from the interrupt controller 5 when the interrupt request IRQ1 is input, and accepts the interrupt request IRQ1 if the interrupt status information is "1".

When determining that the interrupt cause that the processor 1 must process has occurred in step s4, the processor 1 executes the interrupt handler corresponding to the relevant interrupt cause to perform the interrupt processing.

When determining that the interrupt cause that the processor 1 must process has not occurred in step s4, the processor 1 references the interrupt information IIF in the interrupt information storage unit 6 in step s41 and acquires the interrupt priority for each remaining interrupt causes other than the interrupt cause that the processor 1 processes of the interrupt causes sharing the interrupt request IRQ1. The processor 1 then selects a processor that processes the interrupt cause having the highest interrupt priority of the interrupt causes having an interrupt priority lower than the interrupt priority of the interrupt cause that the processor 1 processes based on the acquired interrupt priorities.

Since the processor that processes the interrupt cause having the highest interrupt priority of the interrupt causes sharing the interrupt request IRQ1 accepts the interrupt request IRQ1, the relevant processor selects another processor that processes the interrupt cause having the highest interrupt priority in the remaining interrupt causes other than the interrupt cause that the relevant processor processes of the plurality of interrupt causes sharing the interrupt request IRQ1 in step s41. Since the interrupt information IIF shown in FIG. 10 is stored in the interrupt information storage unit 6 in the present example, the processor 2 accepts the interrupt request IRQ1, and the processor 2 selects the processor 1 that processes the interrupt cause number one having the highest interrupt priority in the interrupt causes number one and number four in step s41.

In step s42, the processor 1 that has executed step s41 then notifies the generation of the interrupt request IRQ1 to the processor selected in step s41.

In the present fourth embodiment as well, when notified of the generation of the interrupt request IRQ1 from another processor in step s7, the processor 1 executes step s4 and thereafter executes step s5 or executes steps s41 and s42 depending on the determination result of step s4.

The operation of the processor 3 of when the interrupt request IRQ2 is input from the interrupt controller 5 to the processor 3 is the same as in the first embodiment.

In the present fourth embodiment, since the processors 1 to 3 to be notified of the interrupt request IRQ1 and the processor 3 to be notified of the interrupt request IRQ2 overlap, the interrupt controller 5 outputs only one of either the interrupt request IRQ1 or IRQ2 based on the interrupt priority, as described in the first embodiment, when the interrupt requests IRQ1, IRQ2 are simultaneously input to prevent a plurality of interrupt requests from being simultaneously input to one processor.

As described above, in the multiprocessor system according to the fourth embodiment, the processor accepting the interrupt request IRQ1 notifies the generation of the interrupt request IRQ1 to the processor that processes the interrupt cause having the highest interrupt priority in the remaining interrupt causes other than the interrupt cause that the processor processes of the plurality of interrupt causes sharing the interrupt request IRQ1 when the interrupt cause that the processor 1 must process has not occurred. Therefore, the response delay with respect to the occurrence of the interrupt cause having high interrupt priority can be reduced.

Fifth embodiment

FIG. 12 is a view showing a configuration of a multiprocessor system according to the fifth embodiment of the present invention. The multiprocessor system according to the present fifth embodiment basically has the IO device 14 further arranged in the multiprocessor system according to the third embodiment, and the operation of the processors 1 to 3 is changed. The multiprocessor system according to the present fifth embodiment will be described below focusing on the difference with the multiprocessor system according to the third embodiment.

In the present fifth embodiment, the interrupt request IRQ1 to be input to the interrupt controller 5 is shared by a plurality of interrupt causes occurring in the 10 devices 11, 12, 14 similar to the fourth embodiment.

FIG. 13 is a flowchart showing the operation until executing the interrupt processing in the processors 1 to 3 according to the fifth embodiment. Since the processors 1 to 3 perform similar operation with respect to each other, the operation of the processor 1 will be centrally described below.

As shown in FIG. 13, the processor 1 sequentially executes steps s2 and s31. When determining that the processor priority of the processor 1 is the highest in the processors 1 to 3 that process a plurality of interrupt causes sharing the interrupt request IRQ1 in step s31, the processor 1 executes steps s1, sets the interrupt controller 5 so as to be notified of the interrupt request, and thereafter, sequentially executes steps s3 and s4. When determining that processor having a higher processor priority than the processor priority of the processor 1 exists in step s31, the processor 1 sequentially executes steps s3 and s4 without executing step s1.

In this manner, only the processor having the highest processor priority of the processors that process the plurality of interrupt causes sharing the interrupt request IRQ1 accepts the interrupt request IRQ1.

When determining that the interrupt cause that the processor 1 must process has occurred in step s4, the processor 1 executes the interrupt handler corresponding to the interrupt cause to perform the interrupt processing.

When determining that the interrupt cause that the processor 1 must process has not occurred in step s4, the processor 1 references the information in the processor priority storage unit 7 and acquires the processor priorities for each reaming processors other than itself of the processors that process the plurality of interrupt causes sharing the interrupt request IRQ1 in step s51. The processor 1 then selects the processor having the highest processor priority of the processors having a processor priority lower than the processor priority of the processor 1.

Since the processor having the highest processor priority of the processors that process the plurality of interrupt causes sharing the interrupt request IRQ1 accepts the interrupt request IRQ1, the processor having the highest processor priority selects the processor having the highest processor priority in the remaining processors other than itself of the processors processing the plurality of interrupt causes sharing the interrupt request IRQ1 in step s41. Since the information shown in FIG. 7 is stored in the processor priority storage unit 7 in the present example, the processor 2 accepts the interrupt request IRQ1 and the processor 2 selects the processor having the highest processor priority of the processors 1, 3 in step s51.

The processor 1 that has executed step s51 thereafter notifies the generation of the interrupt request IRQ1 to the processor selected in step s51 in step s52.

In the present fifth embodiment as well, when notified of the generation of the interrupt request IRQ1 from another processor in step s7, the processor 1 executes step s4 and thereafter executes step s5 or executes steps s51 and s52 depending on the determination result of step s4.

The operation of the processor 3 of when the interrupt request IRQ2 is input from the interrupt controller 5 to the processor 3 is the same as in the first embodiment.

In the present fifth embodiment, the interrupt controller 5 outputs only one of either the interrupt request IRQ1 or IRQ2 based on the interrupt priority when the interrupt requests IRQ1, IRQ2 are simultaneously input to prevent the plurality of interrupt requests from being simultaneously input to one processor, similar to the fourth embodiment.

Therefore, in the multiprocessor system according to the present fifth embodiment, the processor accepting the interrupt request IRQ1 notifies the generation of the interrupt request IRQ1 to the processor having the highest processor priority in the processors 1 to 3 that process the plurality of interrupt causes sharing the interrupt request IRQ1 when the interrupt cause that processor must process has not occurred. Therefore, the response delay with respect to the occurrence of the interrupt cause in the desired processor is reduced.

While the invention has been shown and described in detail, the foregoing description is in all aspects illustrative and not restrictive. It is therefore understood that numerous modifications and variations can be devised without departing from the scope of the invention.

What is claimed is:

1. A multiprocessor system comprising:
   a plurality of processors; and
   an interrupt controller for receiving plural interrupt requests, one of which is shared by plural interrupt causes, and for outputting said interrupt request to said processors based on a number identifying said interrupt request; wherein said interrupt controller determines which one or ones of processors in said plurality of processors should be issued with said interrupt request for performing an interrupt operation corresponding to said interrupt request;

one processor in said ones of processors receiving said interrupt request determines whether or not to perform said interrupt operation for said interrupt request corresponding to said interrupt cause, and notifies another processor in said ones of processors when determines that the interrupt operation is not performed therein, and another processor in the ones of processors stops determining whether or not to perform said interrupt operation when the one processor already starts determining and starts performing the interrupt operation in response to said notification from said one processor.

2. The multiprocessor system according to claim 1, wherein each of said plurality of interrupt causes is assigned with an interrupt priority indicating a priority of processing; and said processor processing an interrupt cause having a highest interrupt priority of said plurality of interrupt causes accepts said interrupt request output from said interrupt controller.

3. The multiprocessor system according to claim 1, wherein each of said plurality of processors is assigned with a processor priority indicating a priority for executing an interrupt processing; and a processor having a highest processor priority of said processors that process said plurality of interrupt causes accepts said interrupt request output from said interrupt controller.

4. The multiprocessor system according to claim 1, wherein each of said plurality of interrupt causes is assigned with an interrupt priority indicating a priority of processing; and said one processor in said ones of processors receiving said interrupt request notifies said another processor in said ones of processors that processes an interrupt cause having a highest interrupt priority of other said interrupt causes when said interrupt cause that said processor accepting said interrupt request must process has not occurred.

5. The multiprocessor system according to claim 1, wherein each of said plurality of processors is assigned with a processor priority indicating a priority for executing an interrupt processing; and said one processor in said ones of processors receiving said interrupt request notifies another processor in said ones of processors having a highest processor priority of other said processors that process other said interrupt causes when said interrupt cause that said one processor receiving said interrupt request must process has not occurred.

6. The multiprocessor system according to claim 2, wherein said one processor in said ones of processors receiving said interrupt request notifies said another processor in said ones of processors that processes an interrupt cause having a highest interrupt priority of other said interrupt causes when said interrupt cause that said one processor receiving said interrupt request must process has not occurred.

7. The multiprocessor system according to claim 3, wherein said one processor in said ones of processors receiving said interrupt request notifies said another processor in said ones of processors having a highest processor priority of other said processors that process other said interrupt causes when said interrupt cause that said one processor receiving said interrupt request must process has not occurred.

* * * * *